United States Patent [19]

Medina

[11] 4,137,875

[45] Feb. 6, 1979

[54] AUXILIARY AIR INLET DEVICE FOR INTERNAL COMBUSTION ENGINES

[76] Inventor: Sergio P. Medina, Calle Pachuca Manzan 32 Elote 10, San Geronimo, Lidice, Mexico, 20 D.F.

[21] Appl. No.: 859,482

[22] Filed: Dec. 12, 1977

[51] Int. Cl.$^2$ .......................................... F02M 23/02
[52] U.S. Cl. ........................... 123/119 D; 123/124 R; 123/141; 261/DIG. 19
[58] Field of Search ....... 123/119 D, 124 R, 119 DB, 123/97 B, 141; 261/DIG. 19, 65, 78 R, 141; 48/180 R

[56] References Cited

U.S. PATENT DOCUMENTS

| 975,406 | 11/1910 | Fogler | 123/119 D |
|---|---|---|---|
| 1,128,470 | 2/1915 | MacDonald | 123/119 D |
| 1,480,032 | 1/1924 | Thrill | 123/119 D |
| 1,942,187 | 1/1934 | Ruffino | 123/119 D |
| 2,093,918 | 9/1937 | Lord | 123/119 D |
| 2,659,667 | 11/1953 | Bosdet | 123/119 D |
| 3,437,467 | 4/1969 | Jacobus | 123/141 X |
| 3,564,580 | 2/1971 | Cinque | 123/141 X |
| 3,730,160 | 5/1973 | Hughes | 123/141 |
| 3,857,375 | 12/1974 | Jackson | 123/141 |

FOREIGN PATENT DOCUMENTS

| 2035428 | 1/1972 | Fed. Rep. of Germany | 123/141 |
|---|---|---|---|
| 398314 | 9/1933 | United Kingdom | 123/141 |
| 1190803 | 5/1970 | United Kingdom | 123/141 |

Primary Examiner—Wendell E. Burns
Attorney, Agent, or Firm—Gary Appel

[57] ABSTRACT

An auxiliary air inlet Device for an internal combustion engine, the device including a metal base having a chamber or opening for passage of fuel from the carburetor therethrough, the base having a cavity for admitting air from the atmosphere into the opening through a plurality of tubes extending into the opening. The opening is provided with a perforated plate enclosing the lower end thereof, the plate being in communication with and contiguous to, the tubes, which may likewise be perforated. Air is admitted from the atmosphere to improve the air-fuel mixture.

8 Claims, 4 Drawing Figures

AUXILIARY AIR INLET DEVICE FOR INTERNAL COMBUSTION ENGINES

CROSS-REFERENCE TO RELATED APPLICATION

The device of this patent application is related to the device of U.S. patent application Ser. No. 680,031, filed Apr. 30, 1976 entitled "Antecarburetor or Combustion Motors" of Sergio Pena Medina now abandoned.

BACKGROUND OF THE INVENTION

The background of the invention will be discussed in two parts:

Field of the Invention

This invention relates to an Auxiliary Air Inlet Device.

Description of the Prior Art

Many adapters have been devised for attachment between the carburetor and intake manifold of an internal combustion engine for drawing air from the atmosphere into this location to improve the air-fuel mixture and the economies of fuel usage. Some of such devices are shown and described in U.S. Pat. Nos. 1,029,898; 1,118,865; 1,558,605; 1,748,203; 1,942,187; 2,377,852; 3,973,534; and 3,943,900. Other such devices are shown and described in German Pat. No. 591,918; Austrian Pat. No. 146,751; British Pat. No. 362,941; British Pat. No. 379,951; French Pat. No. 632,416; Italian Pat. No. 258,016; and Australian Pat. No. 143,514.

In U.S. Pat. No. 1,558,605 and Austrian Pat. No. 146,751 a wire mesh or screen is positioned across the opening, the screen being utilized to break up the incoming fuel mixture. Air is drawn in to the opening from the atmosphere through an orifice passing through the device.

In other of the above enumerated patents, the devices are provided with circumferential passageways about the opening, the air from the atmosphere being drawn into the passageway prior to entry into the opening of the auxiliary air inlet device.

In the above-identified related patent application, an antecarburetor is provided with a single air inlet tube extending partially into the opening through which the fuel mixture passes, the tube having adjacent thereto a perforated dispersal plate extending partially into the opening. The device of this patent application comprises an improvement of that antecarburetor device.

It is an object of this invention to provide a new and improved auxiliary air inlet device for internal combustion engines.

It is another object of this invention to provide an auxiliary air inlet device for use with single or multiple barrel carburetor engines.

It is a further object of this invention to provide a new and improved auxiliary air inlet device which is economical in construction and efficient in operation.

It is still another object of this invention to provide a new and improved auxiliary air inlet device which improves the quality of the air-fuel mixture by rendering the mixture homogeneous to assist in the obtaining of complete and efficient combustion.

SUMMARY OF THE INVENTION

The foregoing and other objects of the invention are accomplished by providing an auxiliary air inlet device for internal combustion engines having a base member of a uniform thickness with an opening therein for aligning between the throat of the carburetor and the intake manifold of the engine, the base having a rectangular cavity formed in an edge thereof with apertures communicating with the opening for drawing air from the atmosphere therethrough. A plurality of tubes are positioned in the opening of the base member, each of the tubes terminating in a Venturi opening, such Venturi openings being positioned at pre-determined locations within the main barrel opening. Enclosing the main barrel opening adjacent the downstream end thereof is a perforated plate member in abutting relation with the adjacent edges of the tube members. The tubes may be perforated adjacent the perforated plate. A needle valve is provided for regulating the air intake.

Other objects, features and advantages of the invention will become apparent from a reading of the specification when taken in conjunction with the drawings in which like reference numerals refer to like elements in the several views.

DESCRIPTION OF THE PREFERRED EMBODIMENT

Figure 1:
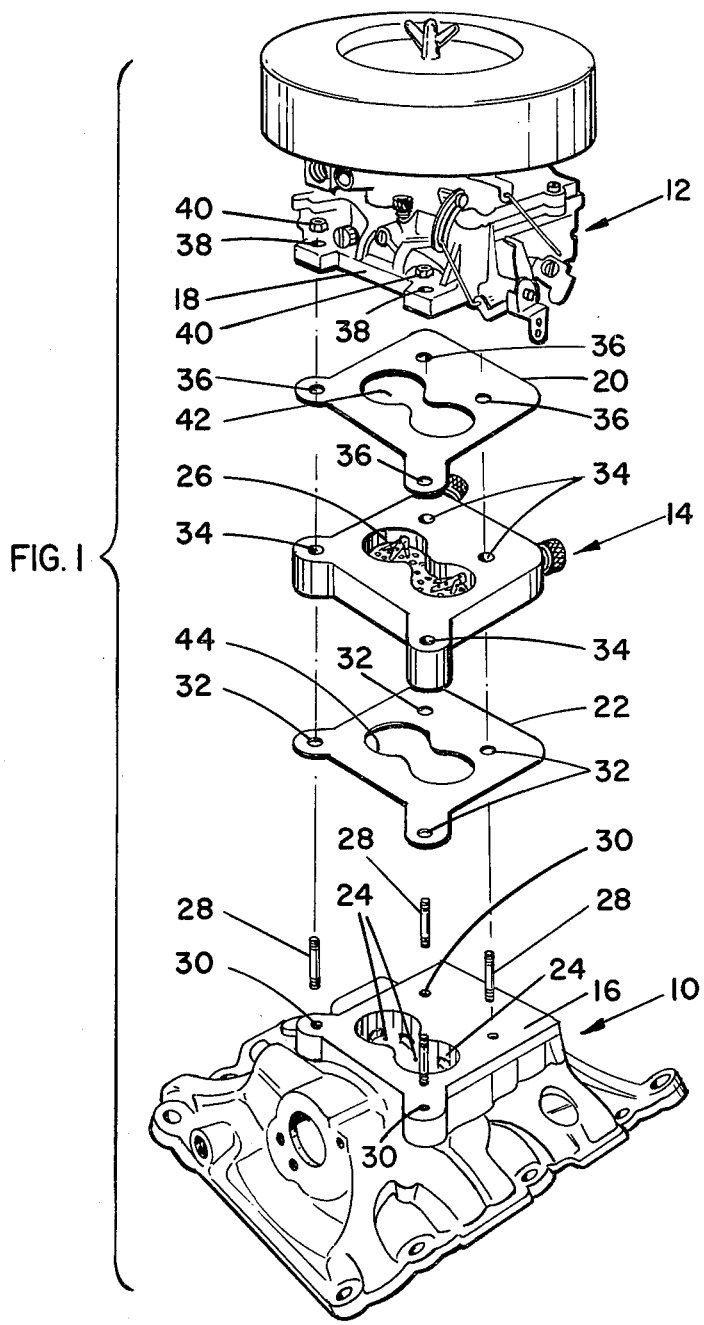
FIG. 1 is a perspective exploded view illustrating the mounting of the auxiliary air inlet device according to the invention between a carburetor and intake manifold.

Referring now to the drawings and particularly to FIG. 1, there is shown an intake manifold generally designated 10 of an internal combustion engine and a carburetor generally designated 12 normally secured to the manifold 10 with suitable gasket means interposed therebetween. An auxiliary air inlet device, generally designated 14, is configured for interposing between the planar portion 16 of the intake manifold 10 and the base 18 of the carburetor 12 with gaskets 20 and 22 adapted for insertion on either side of the air inlet device 14. In the illustration of FIG. 1, the carburetor 12 is what is referred to as a two-barrel carburetor, the intake manifold 10 having openings 24 passing therethrough and being configured for alignment with the two-barrels of the carburetor 12. The air inlet device 14 is provided with an opening 26 configured to conform to the passageway defined by openings 24 and the barrels of carburetor 12. A plurality of studs 28, are provided with threads on opposite ends thereof for threadably engaging threaded apertures 30 in the planar portion 16 of intake manifold 10, the studs 28 then passing through aligned apertures 32 of gasket 22, thence through mounting apertures 34 of the air inlet device 14, then through apertures 36 of the gasket 20 and then though apertures 36 of the gasket 20, and then through openings 38 in the base 18 of carburetor 12 with suitable nuts 40 engaging the ends of studs 28 to maintain the components in alignment in assembled relation on the manifold 10. As can be seen, the gaskets 20 and 22 are generally identical and provided with elongated openings 42 and 44 therein in general alignment with the opening 26 of the air inlet device 14.

Figure 2:
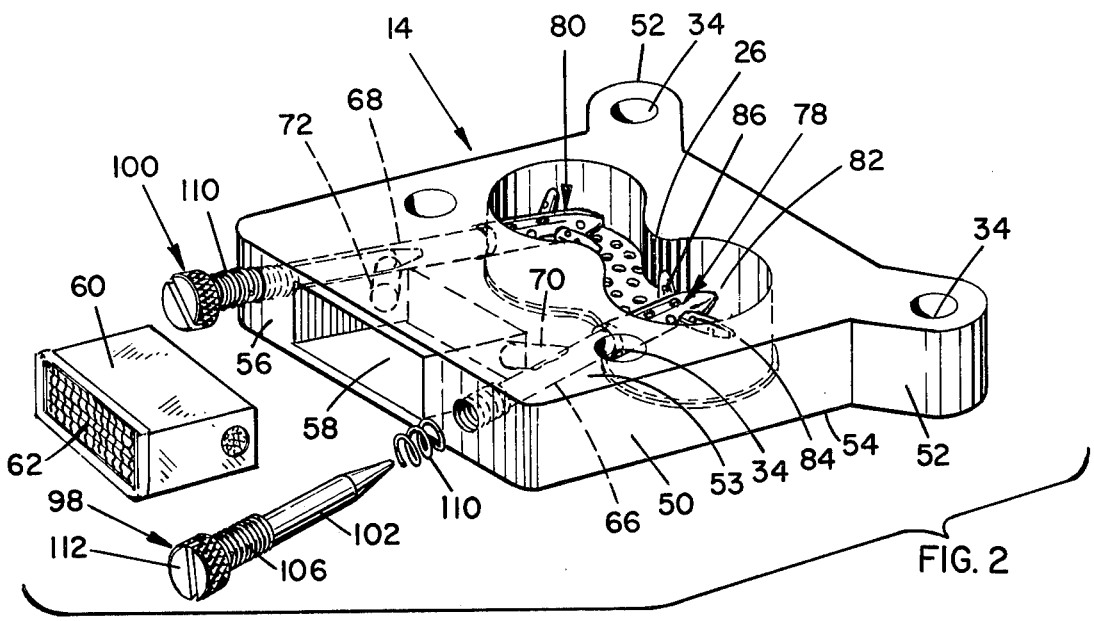
FIG. 2 is a partially exploded perspective view of the auxiliary air inlet device according to the invention.
Figure 3:
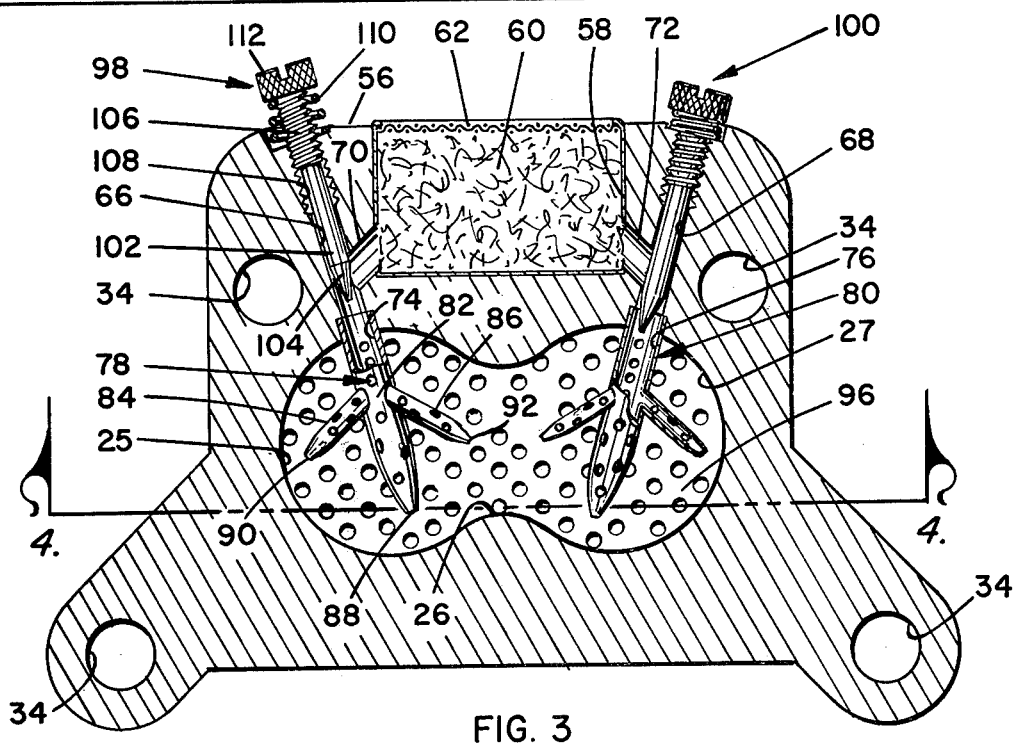
FIG. 3 is a plan view, partially in cross-section and partially broken away, of the auxiliary air inlet device of FIG. 2.
Figure 4:
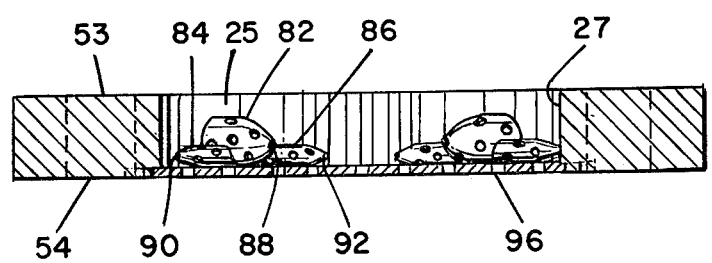
FIG. 4 is a cross-sectional view taken generally along line 4—4 of FIG. 3.

Referring now to FIGS. 2-4, the auxiliary air inlet device 14 will be discussed in detail. As can be seen the device 14 includes a base member 50 of generally rectangular configuration with outwardly extending lug portions 52 through which the mounting openings 34 extend, the base member 50 generally being formed or cast of a suitable metal. The upper and lower surfaces 52 and 54 respectively are generally planar and parallel with the overall outer configuration being substantially identical to the configuration of the base 18 of the carburetor 12 with which it is to be used. The thickness of the base member 50 is uniform and of a dimension sufficiently large to form the openings required for the admission of air while yet sufficiently small to prevent unduly raising the overall height of the carburetor with the auxiliary air device 14 installed on the engine. The terms upper and lower used with reference to the surfaces 53 and 54 are relative terms, with the upper surface 53 being adapted to abuttingly engage the base 18 of the carburetor 12 with the intervening gasket 20, and lower surface 54 being adapted to abuttingly engage the planar surface 16 of the intake manifold 10 with the interposed gasket member 22.

One edge 56 of the base member 50 is provided with a centrally disposed inwardly-extending rectangularly configured cavity 58 configured for receiving a matingly dimensioned filter member 60 therein, the filter member 16 being formed of any known filtering material such as wire mesh, foam or the like. The outer surface of the filter member 60 is provided with a screen 62 to assist in the filtering action and to provide a certain amount of rigidity for the filter member 60 during insertion within the cavity 58.

As best illustrated in FIG. 3, the opening 26 is elongate in form with substantially circular wall portions 25 and 27 at opposite ends thereof, the circular portions 25 and 27 having an overall diameter generally coextensive with the overall diameter of each of the barrels of the carburetor 12 and similarly the openings 24 of intake manifold 10. The base member 50 if provided with first and second access apertures 66 and 68 extending from edge 56 generally diagonally inwardly toward each of the circular portions 25 and 27 of opening 26, the extension of each of these access openings being generally along a diameter of the circular portions. The cavity 58 is provided with intermediate access openings 70 and 72 extending diagonally outward from the inner end of cavity 58 to communicate with the access openings 66 and 68, to thereby provide a flow path for air passing from the atmosphere through filter member 60, thence through intermediate access opening 70 and 72, thence through the primary access opening 66 and 68. The exit ends of access openings 66 and 68 are counter-bored to provide enlarged openings 74 and 76 respectively, into which are inserted tube assemblies generally designated 78 and 80 respectively. Each of the tube assemblies 78 and 80 is substantially identical, and with reference to tube assembly 78, the assembly includes a main tube 82 with first and second branch tubes 84 and 86 respectively, the terminal ends of each of the tubes 82, 84 and 86 terminating in reduced diameter Venturi openings 88, 90 and 92 respectively. The three tubes are in the form of a "tree" extending into the circular portion 25 of the opening 26 with the Venturi openings 88, 90 and 92 being positioned at predetermined locations. As illustrated, the main tube 82 is inserted into opening 74 and has a larger diameter than either of the branch tubes 84 and 86, each of the latter being of the same diameter. By way of illustration, the diameter of the circular portion 25 of the opening 26 is one and one-half inches with the diameter of the main tube 82 being one-quarter inch outside diameter with the branch tubes 84 and 86 having a one-eighth inch outer diameter. The main tube 82 is coaxial with the access opening 66, this axis being generally intermediate the upper and lower surfaces 53 and 54 respectively. Each of the branch tubes 84 and 86 is secured to the main tube 82 at a location intermediate the counter-bored portion 74 and the Venturi opening 88 thereof with the two branch tubes diverging outwardly. The branch tubes 84 and 86 are connected to provide fluid communication with the interior of the main tube 82 to permit a portion of the air passing through the main tube 82 to pass out through the respective nozzle openings 90 and 92 of the branch tubes 84 and 86 respectively. The other tube assembly 80 is configured substantially identical and extends into the circular portion 27 for the other barrel of the carburetor 12.

Substantially enclosing the exit end of opening 26 is a perforated diffuser plate 96 which is generally planar and includes a plurality of perforations for passage of the air-fuel mixture therethrough into the intake manifold 10. As best illustrated in FIG. 4, the lower edges of the tubes 82, 84 and 86 are in abutting engagement with the upper surface of the diffuser plate 96 and the abutting edge of each of the tubes may optionally be provided with perforations extending through the diffuser plate 96 and through the abutting edges of each of the tubes to facilitate passage of air from the tubes into the intake manifold 10.

The metering or control of the air passing from the atmosphere to the filter member 60 through the access opening 66 and 68 is controlled by a pair of needle valve assemblies generally designated 98 and 100 respectively, the needle valve 98 being of generally conventional configuration and having a main body portion 102 with a needle end 104 extending in proximity to the intermediate access opening 70. The needle valve assembly is provided with a threaded portion 106 received within a threaded opening 108 in the outer edge of access opening 66 with a retention spring 110 encircling the shaft and abutting between the needle valve cap 112 and a flat surface adjacent the edge 56 about access opening 66. Adjustment of the needle valve assembly 98 inwardly reduces the amount of air flowing through intermediate chamber 70 into the lower portion of access opening 66 while adjustment outwardly increases the amount of air flow. The description hereinabove has proceeded with reference to a two-barrel carburetor but it is to be understood that the auxiliary air inlet device according to the invention can be utilized in a single barrel carburetor configuration having only one tube assembly, or a four-barrel configuration with four tube assemblies.

In operation, referring to FIG. 4, the fuel-air mixture from the carburetor 12 will be directed in the direction of the arrow toward the entrance end of opening 26. At it enters the chamber formed by the opening 26, air will be withdrawn into the chamber through the Venturi openings of the tube assemblies 78 and 80 to provide a leaner mixture. With the Venturi openings 88, 90 and 92 offset in the radial direction from the center of the circular portion 25 (and similarly the Venturi openings of the tube assembly 80 within the circular portion 27), the main flow path of the incoming fuel-air mixture from the carburetor 12 will be generally centrally located with respect to the circular portion 25 with incoming air from the atmosphere passing through the air inlet device 14 being out toward the periphery of the incoming mixture, resulting in turbulence to assist in the atomizing of the incoming mixture with the newly added air. Further flow toward the exit end of opening 26 passes the so combined mixture through the perforated diffuser plate 96 which assists in further breaking up the mixture at the time of entry into the openings 24 of the intake manifold 10 thus resulting in a more homogeneous fuel-air mixture for more efficient combustion. As stated above, the under surface of each of the tubes of the tube assembly 78 and 80 may have perforations extending therethrough and through the perforated diffuser plate 96 to further assist in creating turbulence immediately beneath the plate 96 by virtue of the air passing through these orifices. Preferably, such orifices would be of smaller diameter relative to the diameter of the respective tube through which the orifices extend.

Essentially, each of the tube assemblies is provided with a plurality of tubes forming a tree-like configuration, the terminal end of each tube being provided with a Venturi opening, with these Venturi openings being offset in a radial direction from the center of the barrel with which the circular portion is associated to provide peripheral turbulence in proximity to the outer wall of the circular portions 25 and 27 respectively. While there has been shown and described a preferred embodiment, it is to be understood that various other adaptations and modifications may be made within the spirit and scope of the invention.

What is claimed is:

1. In an auxiliary air intake device for installing between the carburetor and intake manifold of an internal combustion engine, the combination comprising:
    a base member having a substantially uniform thickness;
    an opening in said member for alignment with the throat of the carburetor for passage of fuel through said opening along a given axis into the intake manifold.
    a cavity formed in said base member, the opening of said cavity being adapted for receiving air from the atmosphere;
    aperture means within said base member communicating with said cavity and with said opening;
    a plurality of tubular members, communicating with said aperture, each of said tubular members terminating in a nozzle opening, said nozzle openings being radially offset from said given axis and;
    a perforated plate member substantially closing the exit end of said opening, said perforated plate member and said tubular members being in abutting relation, said nozzle openings and said perforated plate member creating turbulence in the fuel-air mixture coming from the carburetor to combine said mixture with the air passing through said nozzle openings from said cavity through said aperture means whereby to generate a more homogeneous mixture.

2. The combination according to claim 1 wherein said plurality of tubular members include a main tube in fluid communication with said aperture means and a pair of branch tubes in fluid communication with said main tube.

3. The combination according to claim 2 wherein said main tube has a diameter approximately twice the diameter of said branch tubes.

4. The combination according to claim 3 wherein said nozzle openings are Venturi openings positioned intermediate said given axis and the wall of said opening.

5. The combination according to claim 4 wherein said perforated plate member is integral with said base member.

6. The combination according to claim 5 wherein said aperture means further include adjustment means for regulating flow of air therethrough.

7. The combination according to claim 6 further including filter means insertable within said cavity means.

8. The combination according to claim 7 wherein the sidewalls of said tubular members are in abutting relation with said perforated plate and have perforations extending therethrough.

* * * * *